US012387615B2

(12) United States Patent
Jha et al.

(10) Patent No.: US 12,387,615 B2
(45) Date of Patent: Aug. 12, 2025

(54) SYSTEM AND METHOD FOR DETECTING AND AVOIDING CONFLICTS ALONG A CURRENT ROUTE OF A VEHICLE

(71) Applicant: The Boeing Company, Chicago, IL (US)

(72) Inventors: Shilpa Jha, Somerville, MA (US); Douglas Lipinski, Somerville, MA (US); Joseph Chung, Cambridge, MA (US); Jacob E. Kenin, Acton, MA (US)

(73) Assignee: The Boeing Company, Arlington, VA (US)

( * ) Notice: Subject to any disclaimer, the term of this patent is extended or adjusted under 35 U.S.C. 154(b) by 283 days.

(21) Appl. No.: 17/971,252

(22) Filed: Oct. 21, 2022

(65) Prior Publication Data

US 2024/0296746 A1 Sep. 5, 2024

(51) Int. Cl.
*G08G 5/80* (2025.01)
*G08G 5/21* (2025.01)
(Continued)

(52) U.S. Cl.
CPC ................. *G08G 5/80* (2025.01); *G08G 5/21* (2025.01); *G08G 5/55* (2025.01); *G08G 5/59* (2025.01); *G08G 5/723* (2025.01)

(58) Field of Classification Search
CPC ...... G08G 5/045; G08G 5/0021; G08G 5/006; G08G 5/0078; G08G 5/0043;
(Continued)

(56) References Cited

U.S. PATENT DOCUMENTS 6,393,362 B1 * 5/2002 Burns .................. G05D 1/0278 701/119
6,510,388 B1 * 1/2003 Sporrong ................. G08G 5/80 342/455

(Continued)

OTHER PUBLICATIONS

Zheng Xiang et al., A Centralized Algorithm with Collision Avoidance for Trajectory Planning in Preflight Stage, Jan. 7, 2021, International Journal of Aerospace Engineering, vol. 2021, pp. 1-10.*

(Continued)

*Primary Examiner* — Manglesh M Patel
(74) *Attorney, Agent, or Firm* — Harrity & Harrity, LLP

(57) ABSTRACT

A system and method for detecting and avoiding a conflict along a current route of a vehicle is described. In some implementations, the system accesses or determines trajectories of the vehicle and a plurality of nearby moving objects, the trajectories being determined forward in time. Next, the system performs a comparison of the trajectories, and, predicts one or more conflicts between the vehicle and corresponding ones of the nearby moving objects. The system then determines the most-imminent conflict and selects a maneuver to avoid the most-imminent conflict. The system includes a user interface, where a specific resolution to the conflict is displayed. The specific resolution includes a direction in which to turn the vehicle and the magnitude of heading change. In some alternative implementations, the specific resolution is transmitted to a guidance system of the vehicle where the resolution is automatically executed by the guidance system.

20 Claims, 7 Drawing Sheets

(51) Int. Cl.
*G08G 5/55* (2025.01)
*G08G 5/59* (2025.01)
*G08G 5/72* (2025.01)

(58) Field of Classification Search
CPC .......... G08G 5/0017; G08G 5/80; G08G 5/21; G08G 5/723; G08G 5/55; G08G 5/51; G08G 5/54; G08G 5/59; G08G 5/56
USPC .................................................. 701/301, 120
See application file for complete search history.

(56) References Cited

U.S. PATENT DOCUMENTS

| | | | | |
|---|---|---|---|---|
| 8,660,734 | B2 * | 2/2014 | Zhu | G05D 1/0055 701/23 |
| 9,566,981 | B2 * | 2/2017 | Rebhan | B60W 30/0953 |
| 9,849,044 | B1 * | 12/2017 | Groden | G07C 5/008 |
| 10,102,750 | B2 * | 10/2018 | Aso | B60W 40/02 |
| 10,302,759 | B1 | 5/2019 | Arteaga | |
| 10,710,579 | B2 * | 7/2020 | Lo | B60W 50/0097 |
| 11,084,573 | B1 | 8/2021 | Robertson et al. | |
| 11,142,302 | B1 | 10/2021 | Robertson et al. | |
| 11,167,839 | B2 | 11/2021 | Robertson et al. | |
| 11,167,844 | B2 | 11/2021 | Ivans et al. | |
| 11,465,619 | B2 * | 10/2022 | Silva | B60W 30/0956 |
| 11,731,661 | B2 * | 8/2023 | Costa | B60W 60/0011 701/301 |
| 2002/0152029 | A1 * | 10/2002 | Sainthuile | G08G 5/80 701/4 |
| 2004/0024527 | A1 * | 2/2004 | Patera | G08G 5/045 342/29 |
| 2004/0024528 | A1 * | 2/2004 | Patera | G08G 5/045 340/961 |
| 2004/0239529 | A1 * | 12/2004 | Tran | G08G 5/723 340/961 |
| 2006/0052912 | A1 * | 3/2006 | Meunier | G08G 5/74 701/10 |
| 2007/0043481 | A1 * | 2/2007 | Metschan | G08G 5/32 701/120 |
| 2008/0027647 | A1 * | 1/2008 | Ansell | G01S 13/933 701/301 |
| 2010/0121503 | A1 | 5/2010 | Sundqvist | |
| 2010/0198514 | A1 * | 8/2010 | Miralles | G08G 5/55 701/302 |
| 2010/0292871 | A1 * | 11/2010 | Schultz | G01S 13/867 342/29 |
| 2011/0054739 | A1 * | 3/2011 | Bammert | B62D 15/028 701/41 |
| 2011/0106361 | A1 * | 5/2011 | Staempfle | B62D 15/0265 701/23 |
| 2011/0118980 | A1 * | 5/2011 | Hoy | G01S 13/933 701/301 |
| 2011/0118981 | A1 * | 5/2011 | Chamlou | G08G 5/80 701/301 |
| 2011/0166036 | A1 * | 7/2011 | Nykjaer | C07K 16/286 435/7.1 |
| 2011/0288773 | A1 * | 11/2011 | Hoy | G05D 1/1064 701/301 |
| 2013/0009792 | A1 * | 1/2013 | Shafaat | G01C 23/00 340/979 |
| 2014/0019034 | A1 | 1/2014 | Bushnell | |
| 2014/0249738 | A1 * | 9/2014 | Euteneuer | G08G 5/55 701/301 |
| 2014/0297169 | A1 * | 10/2014 | Le | G08G 5/55 701/121 |
| 2015/0134150 | A1 * | 5/2015 | Farjon | G08G 5/55 701/3 |
| 2016/0247406 | A1 * | 8/2016 | Khatwa | B64D 45/04 |
| 2016/0275801 | A1 * | 9/2016 | Kopardekar | G08G 5/55 |
| 2017/0069214 | A1 * | 3/2017 | Dupray | G08G 5/56 |
| 2018/0025653 | A1 * | 1/2018 | Wang | G08G 5/0043 340/961 |
| 2018/0032040 | A1 * | 2/2018 | Sweet, III | G08G 5/55 |
| 2020/0027358 | A1 * | 1/2020 | Fine | G08G 5/723 |
| 2020/0256702 | A1 * | 8/2020 | Rieb | G06F 3/0483 |
| 2021/0197966 | A1 | 7/2021 | Zhang et al. | |
| 2023/0028792 | A1 * | 1/2023 | Cocaud | G06N 20/00 |
| 2023/0202470 | A1 * | 6/2023 | Lepird | B60W 60/0011 701/67 |
| 2023/0245575 | A1 * | 8/2023 | Osipychev | G08G 5/006 701/3 |

OTHER PUBLICATIONS

John C. Clements, The optimal control of collision avoidance trajectories in air traffic management, 1999, Elsevier Science Ltd., pp. 265-280.*

Stefano Primatesta et al., A Cloud-based Vehicle Collision Avoidance Strategy Unmanned Aircraft System Traffic Management (UTM) in Urban Areas, 2020, IEEE, pp. 309-313.*

Jianwu Tao et al., An Effective Strategy for Collision Avoidance of Multiple UAV's With Unknown Acceleration, 2023, IEEE Access, vol. 11, pp. 112600-112619.*

* cited by examiner

SYSTEM AND METHOD FOR DETECTING AND AVOIDING CONFLICTS ALONG A CURRENT ROUTE OF A VEHICLE

BACKGROUND

Field of the Disclosure

The present disclosure is generally related to collision avoidance systems. More particularly, the present disclosure is related to automated detection and avoidance systems for avoiding vehicle collisions.

Description of Related Art

The use of autonomous aircraft is becoming more prevalent. However, if mitigation systems are not provided, those aircraft will come into contact with other flying objects in the air with greater prevalence too. Collision avoidance systems help prevent mid-air collisions and improve safety and efficiency of autonomous aircraft. There are commercially available systems having user interfaces that monitor traffic and provide a visual view of traffic and related tracks. However, none of the available systems provide specific resolutions for resolving the potential mid-air conflict. For example, commercially available systems do not provide specific heading and direction information for avoiding the collision.

Additionally, existing systems output traffic alert resolution advisories meant to be interpreted by a human pilot and not an autonomous aircraft.

It would therefore be desirable to have a system and method that takes into account at least some of the issues discussed above, as well as other possible issues.

SUMMARY

Example implementations of the present disclosure are directed to a system and method for detecting and avoiding a conflict along a current route of a vehicle (e.g., an aircraft). In some implementations, the system accesses or determines trajectories of the aircraft and a plurality of nearby moving objects, the trajectories being determined forward in time from respective current positions of the aircraft and the plurality of nearby moving objects. Next, the system performs a comparison of the trajectories, and, from that comparison, predicts one or more conflicts between the aircraft and corresponding ones of the nearby moving objects. The system then determines the most-imminent conflict from the one or more conflicts and selects a maneuver to avoid the most-imminent conflict. This process is updated and performed continuously based on the potential conflicts detected. The system includes a user interface, where a specific resolution to the conflict is displayed. The specific resolution includes a direction in which to turn the aircraft and the magnitude of heading change (e.g., "LEFT" 15 degrees). In some alternative implementations, the specific resolution is transmitted to a guidance system of the aircraft where the resolution is automatically executed by the guidance system.

The subject matter provided herein provides a method and system for fully autonomous implementation of a system to prevent loss of well-clear and near mid-air collisions. The present disclosure thus includes, without limitation, the following example implementations.

Some example implementations provide a system for detecting and avoiding conflict along a current route of a vehicle, the system comprising: a memory configured to store computer-readable program code; and processing circuitry configured to access the memory, and execute the computer-readable program code to cause the system to at least: access or determine trajectories of the vehicle and a plurality of nearby moving objects, the trajectories being determined forward in time from respective current positions of the vehicle and the plurality of nearby moving objects; predict, from a comparison of the trajectories, one or more conflicts between the vehicle and corresponding ones of the nearby moving objects; determine a most-imminent conflict from the one or more conflicts based on a set of predefined prioritization rules; select a maneuver to avoid the most-imminent conflict, including: determine, based on the most-imminent conflict, a set of maneuvers, each of the maneuvers in the set comprising a maneuver direction and magnitude of heading change, calculated to maneuver the vehicle away from the current route to thereby avoid the most-imminent conflict; and evaluate the set of maneuvers and select the maneuver to avoid the conflict; and output the selected maneuver on a user interface for use in controlling the vehicle.

In some example implementations of the system of any preceding example implementation, or any combination thereof, the system is further caused to transmit the selected maneuver, including the maneuver direction and the magnitude of heading change, to a guidance system of the vehicle, wherein the guidance system is configured to maneuver the vehicle according to the selected maneuver direction and magnitude of heading change.

In some example implementations of the system of any preceding example implementation, or any combination thereof, the system is further caused to: display a first trajectory of the vehicle on a visual flight rules (VFR) map or terrain map on the user interface, including a current position of the vehicle and the first trajectory pointing from the current position of the vehicle to a future position of the vehicle based on the selected maneuver direction and magnitude of heading change; and display a current position of each of the plurality of nearby moving objects relative to the current position of the vehicle.

In some example implementations of the system of any preceding example implementation, or any combination thereof, the user interface is configured to toggle between the VFR map and the terrain map with the first trajectory displayed thereon.

In some example implementations of the system of any preceding example implementation, or any combination thereof, the system is further configured to display an indicia on the user interface to indicate a status of the vehicle along an updated route, the status including a location of the vehicle along the updated route.

In some example implementations of the system of any preceding example implementation, or any combination thereof, the set of predefined prioritization rules comprises, in ranked order from first to last, the system configured to: determine that a physically closest nearby moving object is the most-imminent conflict if the vehicle is in a near mid-air collision (NMAC) state; determine that a nearby moving object predicted to cause the vehicle to enter a NMAC state is the most-imminent conflict if the vehicle is in a loss of well-clear (LOWC) state; determine that the physically closest nearby moving object is the most-imminent conflict if the vehicle is currently in a LOWC state, but no NMAC state is predicted; or determine that a nearby moving object that is predicted to cause the vehicle to enter an LOWC state earlier than any other nearby moving object is the most-imminent conflict if the vehicle is not currently in an NMAC or LOWC state.

In some example implementations of the system of any preceding example implementation, or any combination thereof, the system caused to evaluate the set of maneuvers includes the system configured to: sort the set of maneuvers by maneuver direction and increasing magnitude of heading change; and select, from the sorted set of maneuvers, a corresponding maneuver including: a maneuver direction that complies with predefined right-of-way rules; and a magnitude of heading change for the vehicle, as the selected maneuver to avoid the conflict.

In some example implementations of the system of any preceding example implementation, or any combination thereof, the system configured to select the corresponding maneuver comprises the system further configured to: select, from the sorted set of maneuvers, a first maneuver direction and magnitude of heading change in the set of maneuvers that does not result in an LOWC state being predicted for the vehicle if the vehicle maneuvers in the selected maneuver direction and magnitude of heading change; select, from the sorted set of maneuvers, the corresponding maneuver with a maneuver direction and magnitude of heading change that maximizes a distance at which the vehicle will remain a first threshold distance away from all of the nearby moving objects if no maneuver direction and corresponding magnitude of heading change will avoid the vehicle entering an LOWC state; or select, from the sorted set of maneuvers, the corresponding maneuver with a maneuver direction and the magnitude of heading change that leads fastest to a state where no conflict between the vehicle and the nearby moving objects is predicted if more than one of the set of maneuvers creates corresponding distances, at which the vehicle will remain away from all of the nearby moving objects, within a second threshold distance of each other.

In some example implementations of the system of any preceding example implementation, or any combination thereof, the set of maneuvers comprises an ordered list of maneuver directions and magnitudes of heading change, wherein the maneuver direction is either left or right and the ordered list is ordered such that all maneuvers with a left maneuver direction are given priority in the ordered list, along with corresponding magnitudes of heading change, over the maneuvers with a right maneuver direction.

In some example implementations of the system of any preceding example implementation, or any combination thereof, the system is provided a preferred maneuver direction; wherein the system is configured to select a maneuver with the preferred maneuver direction unless no maneuver in the set that has the preferred maneuver direction will prevent a loss of well-clear.

Some other example implementations of the present disclosure provide a method for detecting and avoiding conflict along a current route of a vehicle, the method comprising: storing computer-readable program code in a memory and executing the computer-readable program code by processing circuitry configured to access the memory, wherein upon execution of the computer-readable program code, the processing circuitry is configured to perform the steps comprising: accessing or determining trajectories of the vehicle and a plurality of nearby moving objects, the trajectories being determined forward in time from respective current positions of the vehicle and the plurality of nearby moving objects; predicting, from a comparison of the trajectories, one or more conflicts between the vehicle and corresponding ones of the nearby moving objects; determining a most-imminent conflict from the one or more conflicts based on a set of predefined prioritization rules; selecting a maneuver to avoid the most-imminent conflict, including: determining, based on the most-imminent conflict, a set of maneuvers, each of the maneuvers in the set comprising a maneuver direction and magnitude of heading change, calculated to maneuver the vehicle away from the current route to thereby avoid the most-imminent conflict; and evaluating the set of maneuvers and selecting the maneuver to avoid the conflict; and outputting the selected maneuver on a user interface for use in controlling the vehicle.

In some example implementations of the method of any preceding example implementation, or any combination thereof, the method further comprises: transmitting the selected maneuver, including the maneuver direction and the magnitude of heading change, to a guidance system of the vehicle; and using the guidance system to maneuver the vehicle according to the selected maneuver direction and magnitude of heading change.

In some example implementations of the method of any preceding example implementation, or any combination thereof, the method further comprises: displaying a first trajectory of the vehicle on a visual flight rules (VFR) map or terrain map on the user interface, including a current position of the vehicle and the first trajectory pointing from the current position of the vehicle to a future position of the vehicle based on the selected maneuver direction and magnitude of heading change; and displaying a current position of each of the plurality of nearby moving objects relative to the current position of the vehicle.

In some example implementations of the method of any preceding example implementation, or any combination thereof, the user interface is configured to toggle between the VFR map and the terrain map with the first trajectory displayed thereon.

In some example implementations of the method of any preceding example implementation, or any combination thereof, the method further comprises displaying an indicia on the user interface to indicate a status of the vehicle along an updated route, the status including a location of the vehicle along the updated route.

In some example implementations of the method of any preceding example implementation, or any combination thereof, the set of predefined prioritization rules comprises, in ranked order from first to last, the processing circuitry: determining that a physically closest nearby moving object is the most-imminent conflict if the vehicle is in a near mid-air collision (NMAC) state; determining that a nearby moving object predicted to cause the vehicle to enter a NMAC state is the most-imminent conflict if the vehicle is in a loss of well-clear (LOWC) state; determining that the physically closest nearby moving object is the most-imminent conflict if the vehicle is currently in a LOWC state, but no NMAC state is predicted; or determining that a nearby moving object that is predicted to cause the vehicle to enter an LOWC state earlier than any other nearby moving object is the most-imminent conflict if the vehicle is not currently in an NMAC or LOWC state.

In some example implementations of the method of any preceding example implementation, or any combination thereof, wherein evaluating the set of maneuvers includes the processing circuitry: sorting the set of maneuvers by maneuver direction and increasing magnitude of heading change; and selecting, from the sorted set of maneuvers, a corresponding maneuver including: a maneuver direction that complies with predefined right-of-way rules; and a magnitude of heading change for the vehicle, as the selected maneuver to avoid the conflict.

In some example implementations of the method of any preceding example implementation, or any combination thereof, wherein selecting the corresponding maneuver includes the processing circuitry: selecting, from the sorted set of maneuvers, a first maneuver direction and magnitude of heading change in the set of maneuvers that does not result in an LOWC state being predicted for the vehicle if the vehicle maneuvers in the selected maneuver direction and magnitude of heading change; selecting, from the sorted set of maneuvers, the corresponding maneuver with a maneuver direction and magnitude of heading change that maximizes a distance at which the vehicle will remain a first threshold distance away from all of the nearby moving objects if no maneuver direction and corresponding magnitude of heading change will avoid the vehicle entering an LOWC state; or selecting, from the sorted set of maneuvers, the corresponding maneuver with a maneuver direction and the magnitude of heading change that leads fastest to a state where no conflict between the vehicle and the nearby moving objects is predicted if more than one of the set of maneuvers creates corresponding distances, at which the vehicle will remain away from all of the nearby moving objects, within a second threshold distance of each other.

In some example implementations of the method of any preceding example implementation, or any combination thereof, wherein the set of maneuvers comprises an ordered list of maneuver directions and magnitudes of heading change, wherein the maneuver direction is either left or right and the ordered list is ordered such that all maneuvers with a left maneuver direction are given priority in the ordered list, along with corresponding magnitudes of heading change, over the maneuvers with a right maneuver direction.

In some example implementations of the method of any preceding example implementation, or any combination thereof, the method further comprises: receiving a preferred maneuver direction; selecting a maneuver with the preferred maneuver direction unless no maneuver in the set that has the preferred maneuver direction will prevent a loss of well-clear.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

Figure 1:
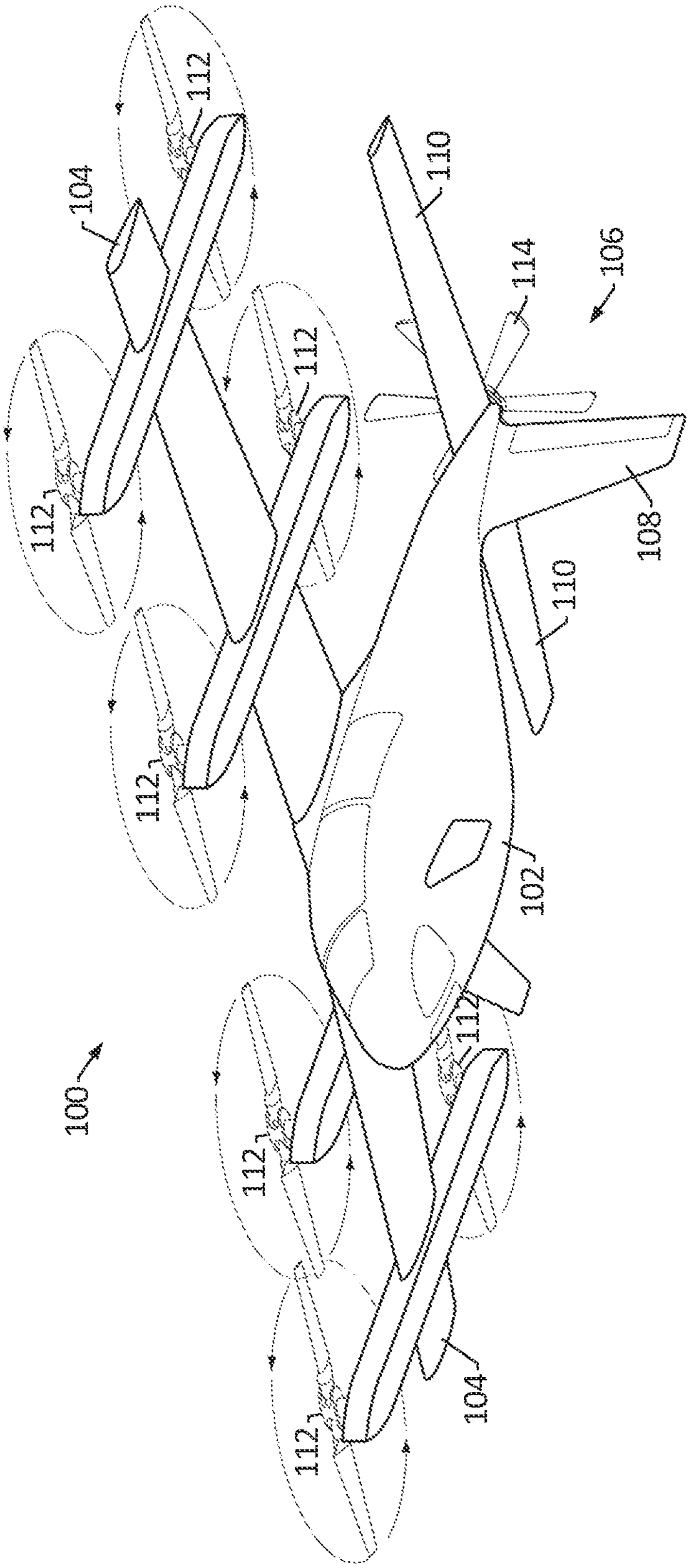
FIG. 1 illustrates an example aircraft, according to some embodiments of the present disclosure.

Some examples of the present disclosure will now be described more fully hereinafter with reference to the accompanying drawings, in which some, but not all aspects of the disclosure are shown. Indeed, various examples of the disclosure are embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) is instead below, and vice versa; and similarly, something described as being to the left of something else is instead to the right, and vice versa. Like reference numerals refer to like elements throughout.

Example implementations of the present disclosure relate generally to aircraft, aerial vehicles, and/or robotic aircraft and, in particular, to one or more of the design, construction, operation or use of robotic aircraft. As used herein, a robotic aircraft is a machine designed and configurable to execute maneuvers in its environment. In some example implementations, the robotic aircraft is manned or unmanned. In some example implementations, the robotic aircraft is fully human-controlled, or the robotic aircraft is semi-autonomous or fully-autonomous in which at least some of the maneuvers are executed independent of or with minimal human intervention. In some examples, the robotic aircraft is operable in various modes with various amounts of human control.

The present disclosure is also relevant in the context of non-aerial robotic or autonomous vehicles (e.g., ground or water vehicles). Examples of suitable robotic aerial and non-aerial vehicles include aerobots, androids, automatons, autonomous vehicles, explosive ordnance disposal robots, hexapods, industrial robots, insect robots, microbots, nanobots, military robots, mobile robots, rovers, service robots, walking robots, and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These include autonomous cars, planes, trains, industrial vehicles, fulfillment center robots, supply-chain robots, robotic vehicles, mine sweepers, and the like.

FIG. 1 illustrates one type of robotic aircraft, namely, a UAV 100. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to, respectively, the wings and the end of the tail assembly for lifting and propelling the UAV during flight. The present disclosure relates to robotic aircraft, but also to pilot-controlled aircraft. Any description herein with respect to the aircraft being autonomous or robotic also relates to describing operations of the method and system herein when the aircraft is pilot-controlled.

Figure 2:
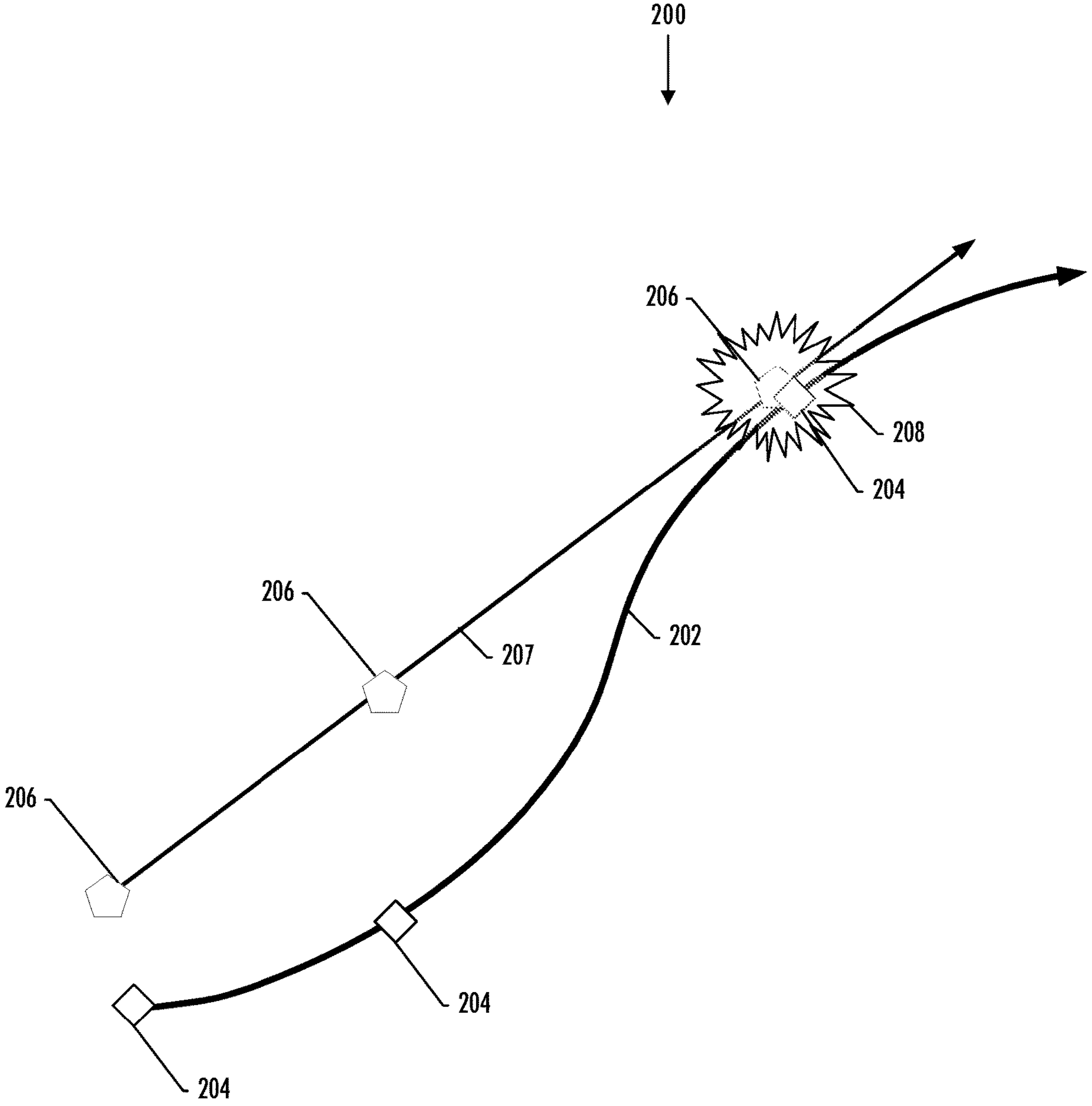
FIG. 2 illustrate example flight paths and collision points of an example aircraft and nearby moving object, according to some embodiments of the present disclosure.

FIG. 2 illustrates an example flight scenario 200 that helps illustrate some implementations of the present disclosure. This flight scenario illustrates an example collision for which the system for detecting and avoiding conflicts of the present disclosure is configured to avoid. The flight scenario includes a first flight path 202 along which an aircraft 204 is traveling. The aircraft is also referred to as the ownship, where the ownship is the aircraft on which the system described herein is located. Multiple instances of the aircraft 204 symbol are shown in FIG. 2 to indicate its movement along the first flight path over time. Also, illustrated in FIG. 2 is a flying object 206 traveling along second flight path 207. Similar to the aircraft, multiple instances of the flying object symbol are shown along the second flight path to illustrate the flying object's movement along the second flight path. While FIG. 2 only depicts one flying object (other than the aircraft 204), the system of the present disclosure is configured to determine maneuvers, as described hereinbelow, for one or more flying objects. If the aircraft and flying object were to continue along their respective flight paths, a collision would occur at collision point 208. This could result in a catastrophic event causing the destruction of both the aircraft and the flying object. As described further below, the system of the present disclosure is configured to help avoid these collisions.

Figure 3A:
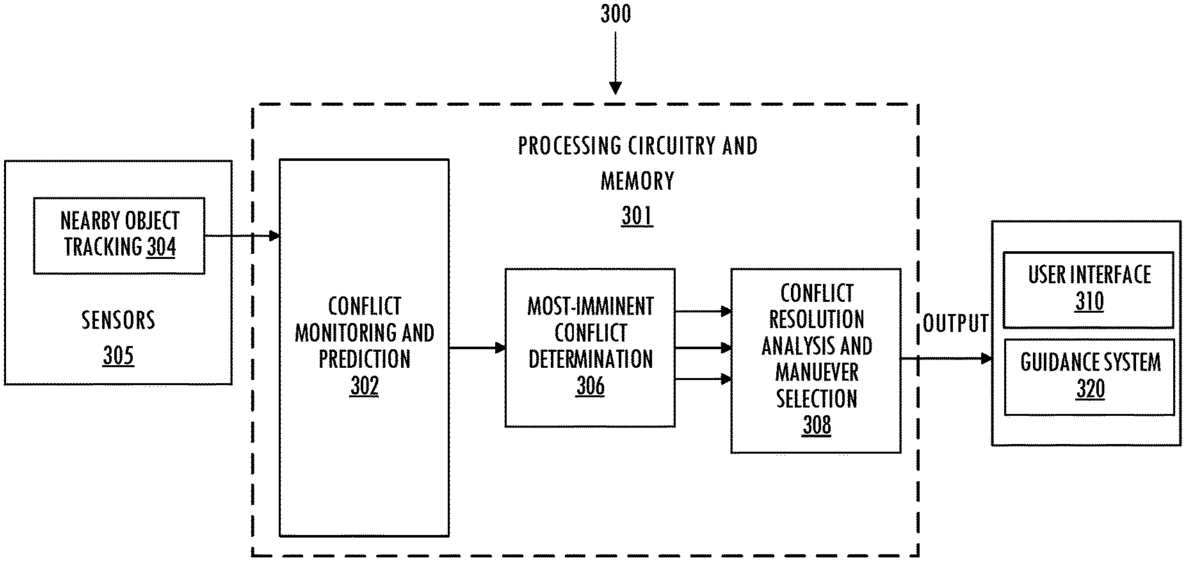
FIG. 3A illustrates an example system block diagram of a detect and avoid system.

FIG. 3A illustrates a block diagram of a system 300 for detecting and avoiding conflict along a current route of an aircraft, such as the aircraft 204 illustrated in FIG. 2. Although the present disclosure and examples make reference to an aircraft, the description provided herein can also be used for any suitable vehicle as described herein. As illustrated in FIG. 3A, the system includes processing circuitry and a memory 301 configured to store computer-readable program code, wherein the processing circuitry is configured to access the memory, and execute the computer-readable program code. The system includes a conflict monitoring and prediction block 302 which receives nearby object tracking information 304 from one or more sensors 305. The sensors include radar sensors, video cameras, motion detectors, or any other suitable sensor that detects moving objects. Alternatively, the sensors described above are located on the ground or located somewhere other than on the aircraft and the aircraft receives or accesses the nearby object tracking data wirelessly from the remote sensors. The system further includes a most-imminent conflict determination block 306 and a conflict resolution analysis and maneuver selection block 308.

In some example implementations, upon execution of the computer-readable program code, the system 300 is configured to access or determine trajectories of the aircraft (e.g., by accessing or determining the ownship path from a guidance system 320 of the aircraft) and a plurality of nearby moving objects (e.g., from the sensors 305), the trajectories being determined forward in time from respective current positions of the aircraft and the plurality of nearby moving objects. That is, the system determines the future trajectories of the flying objects (e.g., based on analyzing the current track of the flying objects from the nearby object tracking data 304 received from the sensors) and itself to determine if a future conflict will occur. To that end, the conflict monitoring and prediction block 302 is configured to predict, from a comparison of the trajectories, one or more conflicts between the aircraft and corresponding ones of the nearby moving objects. FIG. 2 illustrates such a conflict whereby the aircraft 204 and the flying object will collide with each other at the collision point 208.

As described above, the system 300 includes a most-imminent conflict determination block 306, at which the system is configured to determine a most-imminent conflict from the one or more conflicts based on a set of predefined prioritization rules. In some implementations, the set of predefined prioritization rules comprises, in ranked order from first to last, the system configured to: determine that a physically closest nearby moving object is the most-imminent conflict if the aircraft is in a near mid-air collision (NMAC) state; determine that a nearby moving object predicted to cause the aircraft to enter a NMAC state is the most-imminent conflict if the aircraft is in a loss of well-clear (LOWC) state; determine that the physically closest nearby moving object is the most-imminent conflict if the aircraft is currently in a LOWC state, but no NMAC state is predicted; or determine that a nearby moving object that is predicted to cause the aircraft to enter an LOWC state earlier than any other nearby moving object is the most-imminent conflict if the aircraft is not currently in an NMAC or LOWC state. An NMAC is defined as an incident associated with the operation of an aircraft in which a possibility of collision occurs as a result of proximity of less than 500 feet to another aircraft, or a report is received from a pilot or a flight crewmember stating that a collision hazard existed between two or more aircraft.

Well-clear refers to a state in which a pilot considers the situation of the aircraft to be safe in relation to the surrounding traffic. Well-clear and NMAC each have different meanings in different contexts. For example, RTCA standard DO-365B defines well-clear as: 1) 2200 feet horizontal and 450 feet vertical for non-cooperative air traffic (i.e., other aircraft with no transponder); and 2) 4000 feet plus a 35 second "modified tau" value, 450 feet vertical for cooperative aircraft. As another example, RTCA standard DO-365B defines NMAC as 500 feet horizontal and 100 feet vertical. In yet another example, ASTM standard F3442/F3442M-20 (for small UAS) specifies that 1) well-clear is 2000 feet horizontal and 250 feet vertical; and 2) NMAC is 500 feet horizontal and 100 feet vertical.

Once the most-imminent conflict determination block 306 determines the most-imminent conflict, the conflict resolution analysis and maneuver selection block 308 of the system 300 is configured to determine, based on the most-imminent conflict, a set of maneuvers, each of the maneuvers in the set comprising a maneuver direction and magnitude of heading change, calculated to maneuver the aircraft away from the current route to thereby avoid the most-imminent conflict. For example, the set of maneuvers includes a list or table of maneuvers with a maneuver direction (e.g., "LEFT" or "RIGHT") and a corresponding magnitude of heading change (e.g., 1, 2, 3, . . . 90 degrees). The system is further configured to evaluate the set of maneuvers and select the maneuver to avoid the most-imminent conflict. Once the maneuver has been selected, the system is configured to output the maneuver, including the maneuver direction and corresponding magnitude of heading change, on a user interface 310 for use in controlling the aircraft. Controlling the aircraft using the output on the user interface is described in further detail below with respect to FIG. 3B.

In some example implementations, the system 300 is configured to evaluate the set of maneuvers, including the system configured to sort the set of maneuvers by maneuver direction and increasing magnitude of heading change. Following the sorting, the set of maneuvers comprises an ordered list of maneuver directions and magnitudes of heading change, wherein the maneuver direction is either "LEFT" or "RIGHT" and the ordered list is ordered such that all maneuvers with a "LEFT" maneuver direction are given priority, (e.g., listed first) along with corresponding magnitudes of heading change, over the maneuvers with a "RIGHT" maneuver direction. That is, the system sorts the set of maneuvers where all the "LEFT" maneuver direction entries are listed before all the "RIGHT maneuver direction entries (or vice versa) and then within the "LEFT" maneuver direction entries, each of the "LEFT" maneuver direction entries are ordered such that the corresponding magnitudes of heading change are listed in ascending order. The same goes for the "RIGHT" maneuver direction entries. Table 1 below provides an example with a few entries to illustrate this concept.

TABLE 1

Example Set of Maneuvers

| MANEUVER DIRECTION | MANITUDE OF DIRECTION CHANGE |
|---|---|
| Left | 1° |
| Left | 2° |
| Right | 1° |
| Right | 2° |

The system 300 is configured to select, from the sorted set of maneuvers, a corresponding maneuver including: a maneuver direction that complies with predefined right-of-way rules (e.g., such as the right-of-way rules defined by the Federal Aviation Administration [FAA] or other rules setting body for aviation); and a magnitude of heading change for the aircraft, as the selected maneuver to avoid the conflict. The right-of-way rules defined by the FAA determine a preferred direction (left or right) depending on the situation presented.

In some example implementations, the system 300 being configured to select the corresponding maneuver comprises the system further configured to: select, from the sorted set of maneuvers, a first maneuver direction and magnitude of heading change in the set of maneuvers that does not result in an LOWC state being predicted for the aircraft if the aircraft maneuvers in the selected maneuver direction and magnitude of heading change. Alternatively, the system is further configured to select, from the sorted set of maneuvers, the corresponding maneuver with a maneuver direction and magnitude of heading change that maximizes a distance at which the aircraft will remain a first threshold distance away from all of the nearby moving objects if no maneuver direction and corresponding magnitude of heading change will avoid the aircraft entering an LOWC state. As a further alternative, the system is further configured to select, from the sorted set of maneuvers, the corresponding maneuver with a maneuver direction and the magnitude of heading change that leads fastest to a state where no conflict between the aircraft and the nearby moving objects is predicted if more than one of the set of maneuvers creates corresponding distances, at which the aircraft will remain away from all of the nearby moving objects, within a second threshold distance of each other.

In some example implementations, the conflict resolution analysis and maneuver selection block 308 of the system 300 is configured to select a maneuver with a maneuver direction in the preferred direction (e.g., left or right, based on the right-of-way rules discussed above, or based on a received preferred direction) unless no maneuver in the set having the preferred maneuver direction will prevent a loss of well-clear. In some examples, by default, the maneuver selection block will select a maneuver with a left maneuver, however, if a left maneuver will not produce a return to well clear or otherwise resolve the conflict, a maneuver having a "RIGHT" maneuver direction will be selected.

Figure 3B:
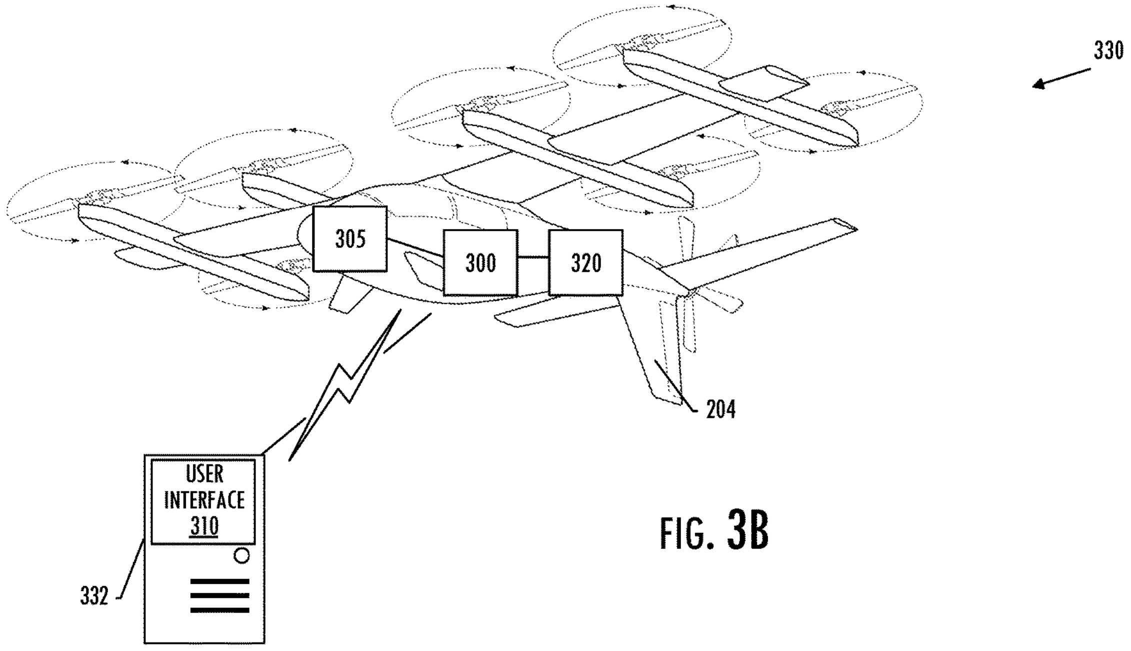
FIG. 3B illustrates the detect and avoid system onboard an example aircraft and various other components, according to some embodiments of the present disclosure.

FIG. 3B illustrates an aerial environment 330 wherein the detect and avoid system 300 is located on an aircraft 204, such as the UAV illustrated in FIG. 1. In some example implementations, the aircraft, including the detect and avoid system is in communication with a ground station 332. In some implementations, the ground station is used to send the nearby object tracking data to the detect and avoid system. In some other implementations, the ground station includes the user interface 310 where a user, such as a remote pilot, will view the user interface and maneuver the aircraft according to the maneuver output to the user interface. Further, as shown in FIG. 3B, the aircraft includes the detect and avoid system onboard the aircraft, the system being in communication with the sensors 305 (e.g., for also collecting flying object tracking data as described above) and the guidance system 320 of the aircraft. In some implementations of the present disclosure, the system is further configured to transmit the selected maneuver, including the maneuver direction and the magnitude of heading change, to the guidance system of the aircraft, wherein the guidance system is configured to maneuver the aircraft (e.g., automatically maneuver the aircraft) according to the selected maneuver direction and magnitude of heading change.

As described above, in some implementations, the aircraft is fully autonomous (i.e., the maneuver is executed by the guidance system 320), partially autonomous (e.g., some aspects of the maneuver are executed by the guidance system and other parts are executed by a human operator), or fully controlled by a human (i.e., the ground station 332 comprises a joy stick or other user interface allowing a pilot on the ground to execute the maneuver manually).

Figure 3C:
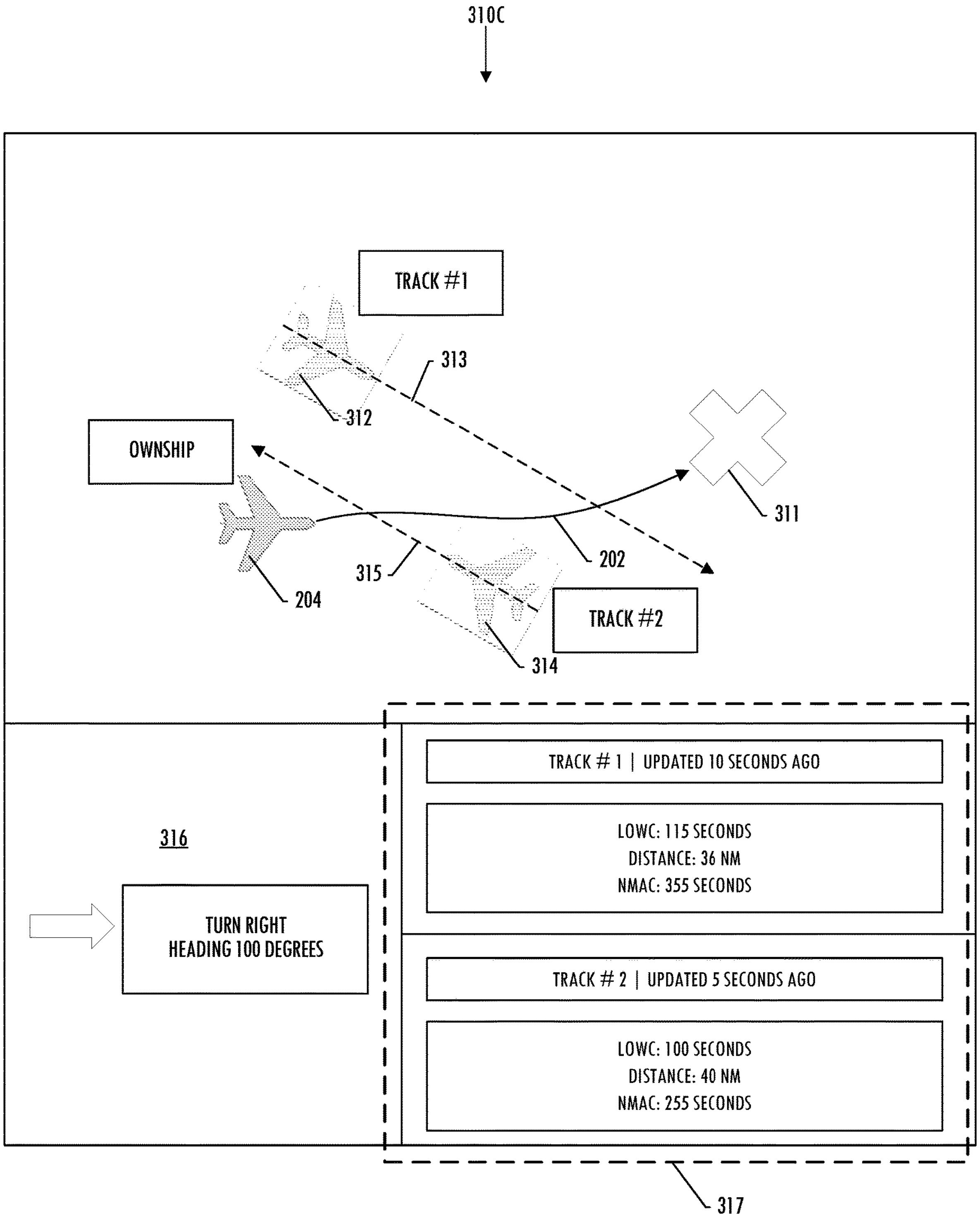
FIGS. 3C and 3D illustrate various views of an example user interface, according to some embodiments of the present disclosure.

FIG. 3C illustrates an example user interface 310C (e.g., such as a graphical user interface) according to some implementations of the present disclosure. In some example implementations, the system is further configured to display, on the user interface, a first trajectory of the aircraft on a visual flight rules (VFR) map or terrain map on the user interface, including a current position of the aircraft and the first trajectory pointing from the current position of the aircraft to a future position of the aircraft based on the selected maneuver direction and magnitude of heading change. The system is further configured to display a current position of each of the plurality of nearby moving objects relative to the current position of the aircraft on the user interface. In the example user interface illustrated in FIG. 3C, the aircraft 204 (also referred to as the ownship) is flying along first flight path 202 towards destination 311. In addition, flying object 1 312 is displayed and has a trajectory 313 that will intersect with the first flight path, and flying object 2 314 is displayed and has a trajectory 315 that will intersect with the first flight path. In some implementations, the user interface is configured to toggle between the VFR map and the terrain map with the first trajectory (e.g., the first flight path) displayed thereon.

Once the system 300 determines the maneuver with respect to flying object 1 312 and flying object 2 314 according to the description above, it displays an arrow and instruction 316 indicating the maneuver direction (e.g., "RIGHT" in the example illustrated in FIG. 3C) and magnitude of the change of direction of the maneuver (e.g., 100° in this case). In some example implementations, the user interface will also display various data 317 indicating, for example, how long ago the tracking data was updated for the flying objects, when a LWOC is calculated to occur, an estimated distance between the ownship and the flying objects, and how long a near mid-air collision is calculated to occur in the future between the ownship and the flying object.

Figure 3D:
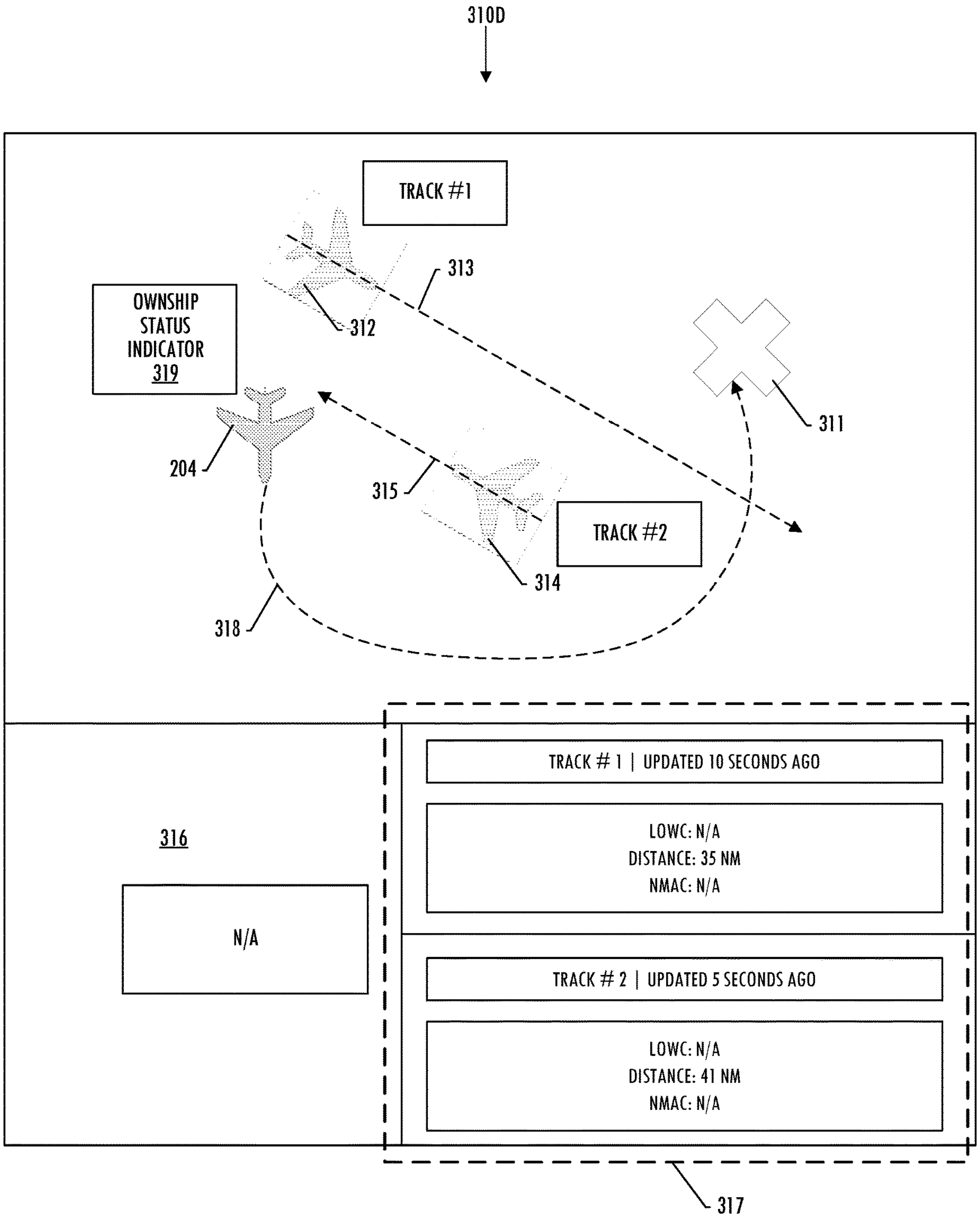

FIG. 3D illustrates another view of a user interface 310D, which is an updated view in time of the user interface 310C, wherein the system has selected the maneuver and the aircraft 204 has executed the maneuver described in relation to FIG. 3C, and is on a new path 318 to travel to the destination 311 and avoid the flying object 1 312 and the flying object 2 314. While the trajectory 313 of flying object 1 still intersects with the new path 318 of the aircraft 204, there is not a conflict calculated because flying object 1 will fly over the intersected path well before the aircraft 204 arrives. In some example implementations, the system is further configured to display an indicia 319 on the user interface to indicate a status of the aircraft along an updated route, the status including a location of the aircraft along the updated route.

The system 300 described above is configured to continuously perform the functions described herein as real-time flying object tracking is received and processed by the system. For example, once a maneuver is selected and the aircraft changes direction according to the maneuver, the process for receiving the flying object tracking data, analyzing the data, detecting conflicts, and determining maneuvers will begin again.

Figure 4:
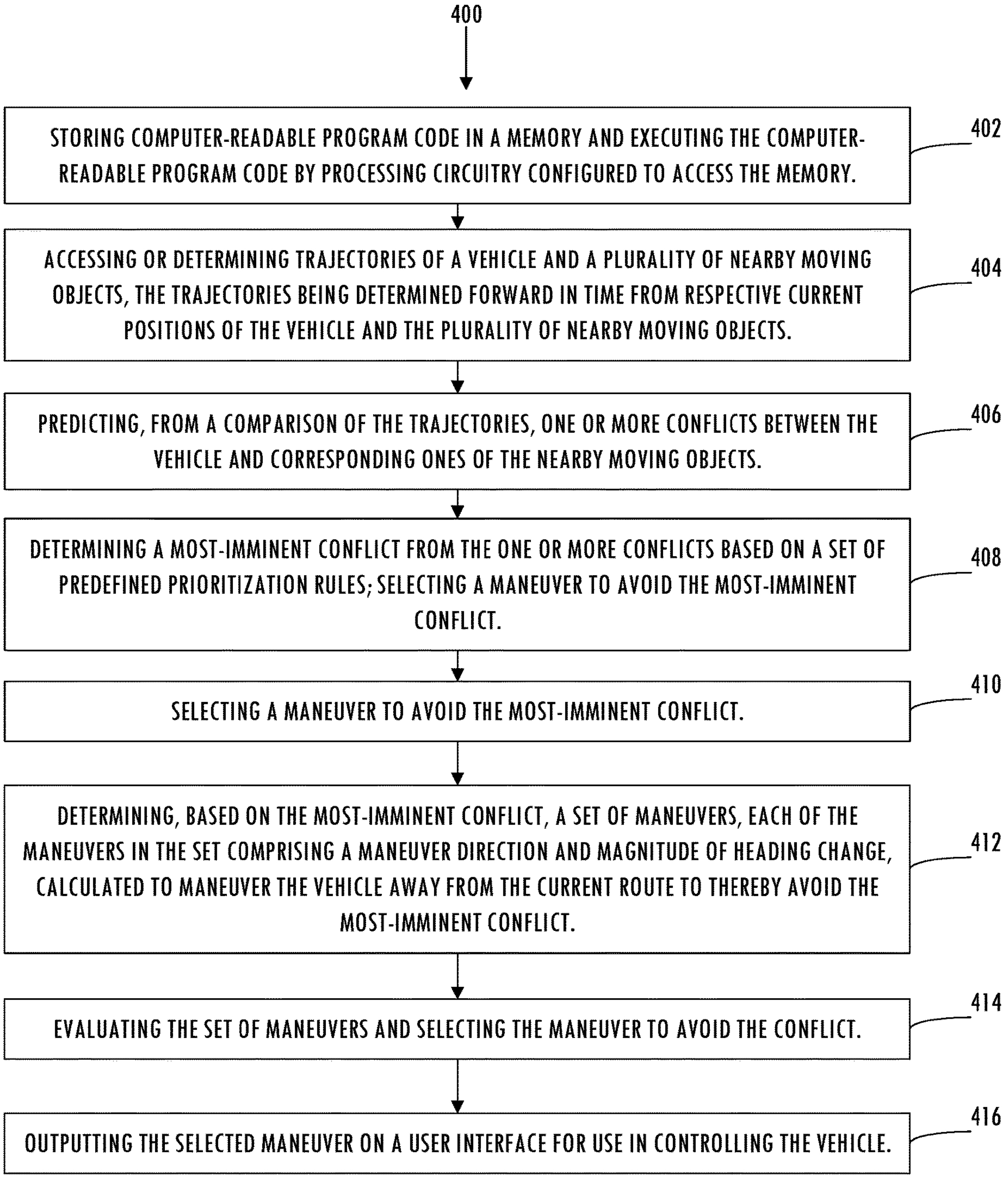
FIG. 4 illustrates a flow chart detailing steps of an example method, according to some embodiments of the present disclosure.

FIG. 4 illustrates a flow chart of an example method 400 for detecting and avoiding conflict along a current route of an aircraft. As shown in the first block 402, the method includes storing computer-readable program code in a memory and executing the computer-readable program code by processing circuitry configured to access the memory. Upon execution of the computer-readable program code, the processing circuitry is configured to perform the following steps. As shown in second block 404, the method includes accessing or determining trajectories of the vehicle and a plurality of nearby moving objects, the trajectories being determined forward in time from respective current positions of the vehicle and the plurality of nearby moving objects. As shown in third block 406, the method includes predicting, from a comparison of the trajectories, one or more conflicts between the vehicle and corresponding ones of the nearby moving objects.

As shown in fourth block 408, the method 400 incudes determining a most-imminent conflict from the one or more conflicts based on a set of predefined prioritization rules. As shown in fifth block 410, the method includes selecting a maneuver to avoid the most-imminent conflict. As shown in sixth block 412, the method includes selecting the maneuver to avoid the most-imminent conflict including determining, based on the most-imminent conflict, a set of maneuvers, each of the maneuvers in the set comprising a maneuver direction and magnitude of heading change, calculated to maneuver the vehicle away from the current route to thereby avoid the most-imminent conflict; and as shown in seventh block 414 evaluating the set of maneuvers and selecting the maneuver to avoid the conflict. As shown eighth block 416, the method further includes outputting the selected maneuver on a user interface for use in controlling the vehicle.

According to example implementations of the present disclosure, the system 300 for detecting and avoiding conflict along a current route of an aircraft is implemented by various means. Means for implementing the system includes hardware, alone or under direction of one or more computer programs from a computer-readable storage medium. In some examples, one or more apparatuses are configured to function as or otherwise implement the system shown and described herein. In examples involving more than one apparatus, the respective apparatuses are connected to or otherwise in communication with one another in a number of different manners, such as directly or indirectly via a wired or wireless network or the like.

Figure 5:
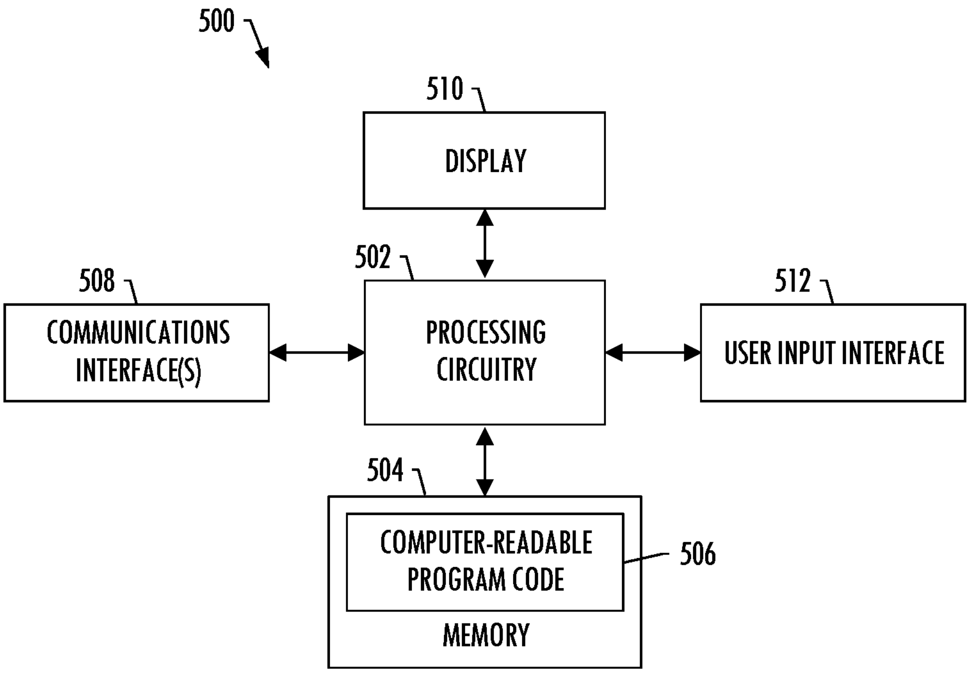
FIG. 5 illustrates an example apparatus for performing the method and other functions described herein, according to some embodiments of the present disclosure.

FIG. 5 illustrates an apparatus 500 capable of implementing the system 300 of FIG. 3A for detecting and avoiding conflict along a current route of an aircraft. The apparatus 500 is an example device that is used to implement the methods and functions described above with respect to the system for detecting and avoiding conflict along a current route of an aircraft. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry 502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus(es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory, and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that direct a computer, a processing circuitry or other programmable apparatus to function in a particular manner to thereby generate a particular machine or particular article of manufacture. The instructions stored in the computer-readable storage medium produce an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are be provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A system for detecting and avoiding conflict along a current route of a vehicle, the system comprising:

a memory configured to store computer-readable program code; and processing circuitry configured to access the memory, and execute the computer-readable program code to cause the system to at least:

access or determine trajectories of the vehicle and a plurality of nearby moving objects, the trajectories being determined forward in time from respective current positions of the vehicle and the plurality of nearby moving objects;

predict, from a comparison of the trajectories, one or more conflicts between the vehicle and corresponding ones of the nearby moving objects;

determine a most-imminent conflict from the one or more conflicts based on a set of predefined prioritization rules;

select a maneuver to avoid the most-imminent conflict, including:

determine, based on the most-imminent conflict, a set of maneuvers, each of the maneuvers in the set comprising a maneuver direction and magnitude of heading change, calculated to maneuver the vehicle away from the current route to thereby avoid the most-imminent conflict;

evaluate the set of maneuvers by sorting the set of maneuvers based on maneuver directions and increasing magnitude of heading change; and select, based on predefined right-of-way rules, the maneuver to avoid the most-imminent conflict, wherein the maneuver direction of the selected maneuver complies with the predefined right-of-way rules;

output the selected maneuver on a user interface; and perform the selected maneuver by controlling the vehicle based on outputting the selected maneuver.

2. The system of claim 1, wherein, to perform the selected maneuver, the system is further caused to transmit the selected maneuver, including the maneuver direction and the magnitude of heading change, to a guidance system of the vehicle, wherein the guidance system is configured to maneuver the vehicle according to the selected maneuver direction and magnitude of heading change.

3. The system of claim 1, being further caused to:

display a first trajectory of the vehicle on a visual flight rules (VFR) map or terrain map on the user interface, including a current position of the vehicle and the first trajectory pointing from the current position of the vehicle to a future position of the vehicle based on the selected maneuver direction and magnitude of heading change; and display a current position of each of the plurality of nearby moving objects relative to the current position of the vehicle.

4. The system of claim 3, wherein the user interface is configured to toggle between the VFR map and the terrain map with the first trajectory displayed thereon.

5. The system of claim 3, further configured to display an indicia on the user interface to indicate a status of the vehicle along an updated route, the status including a location of the vehicle along the updated route.

6. The system of claim 1, wherein the set of predefined prioritization rules comprises, in ranked order from first to last, the system configured to:

determine that a physically closest nearby moving object is the most-imminent conflict if the vehicle is in a near mid-air collision (NMAC) state;

determine that a nearby moving object predicted to cause the vehicle to enter a NMAC state is the most-imminent conflict if the vehicle is in a loss of well-clear (LOWC) state;

determine that the physically closest nearby moving object is the most-imminent conflict if the vehicle is currently in a LOWC state, but no NMAC state is predicted; or determine that a nearby moving object that is predicted to cause the vehicle to enter an LOWC state earlier than any other nearby moving object is the most-imminent conflict if the vehicle is not currently in an NMAC or LOWC state.

7. The system of claim 1, wherein the system caused to evaluate the set of maneuvers includes the system configured to:

sort the set of maneuvers by maneuver direction and increasing magnitude of heading change; and select, from the sorted set of maneuvers, a corresponding maneuver including:

a maneuver direction that complies with the predefined right-of-way rules; and a magnitude of heading change for the vehicle, as the selected maneuver to avoid the conflict.

8. The system of claim 7, wherein the system configured to select the corresponding maneuver comprises the system further configured to:

select, from the sorted set of maneuvers, a first maneuver direction and magnitude of heading change in the set of maneuvers that does not result in a loss of well-clear (LOWC) state being predicted for the vehicle if the vehicle maneuvers in the selected maneuver direction and magnitude of heading change;

select, from the sorted set of maneuvers, the corresponding maneuver with a maneuver direction and magnitude of heading change that maximizes a distance at which the vehicle will remain a first threshold distance away from all of the nearby moving objects if no maneuver direction and corresponding magnitude of heading change will avoid the vehicle entering an LOWC state; or select, from the sorted set of maneuvers, the corresponding maneuver with a maneuver direction and the magnitude of heading change that leads fastest to a state where no conflict between the vehicle and the nearby moving objects is predicted if more than one of the set of maneuvers creates corresponding distances, at which the vehicle will remain away from all of the nearby moving objects, within a second threshold distance of each other.

9. The system of claim 1, wherein the set of maneuvers comprises an ordered list of maneuver directions and magnitudes of heading change, wherein the maneuver direction is either left or right and the ordered list is ordered such that all maneuvers with a left maneuver direction are given priority in the ordered list, along with corresponding magnitudes of heading change, over the maneuvers with a right maneuver direction.

10. The system of claim 9, wherein the system is provided a preferred maneuver direction; and wherein the system is configured to select a maneuver with the preferred maneuver direction unless no maneuver in the set that has the preferred maneuver direction will prevent a loss of well-clear.

11. A method for detecting and avoiding conflict along a current route of a vehicle, the method comprising:

storing computer-readable program code in a memory and executing the computer-readable program code by processing circuitry configured to access the memory, wherein upon execution of the computer-readable program code, the processing circuitry is configured to perform steps comprising:

accessing or determining trajectories of the vehicle and a plurality of nearby moving objects, the trajectories being determined forward in time from respective current positions of the vehicle and the plurality of nearby moving objects;

predicting, from a comparison of the trajectories, one or more conflicts between the vehicle and corresponding ones of the nearby moving objects;

determining a most-imminent conflict from the one or more conflicts based on a set of predefined prioritization rules;

selecting a maneuver to avoid the most-imminent conflict, including:

determining, based on the most-imminent conflict, a set of maneuvers, each of the maneuvers in the set comprising a maneuver direction and magnitude of heading change, calculated to maneuver the vehicle away from the current route to thereby avoid the most-imminent conflict;

evaluating the set of maneuvers by sorting the set of maneuvers based on maneuver directions and increasing magnitude of heading change; and selecting, based on predefined right-of-way rules, the maneuver to avoid the most-imminent conflict, wherein the maneuver direction of the selected maneuver complies with the predefined right-of-way rules;

outputting the selected maneuver on a user interface; and performing the selected maneuver by controlling the vehicle based on outputting the selected maneuver.

12. The method of claim 11, wherein performing the selected maneuver includes the processing circuitry:

transmitting the selected maneuver, including the maneuver direction and the magnitude of heading change, to a guidance system of the vehicle; and using the guidance system to maneuver the vehicle according to the selected maneuver direction and magnitude of heading change.

13. The method of claim 11, further comprising:

displaying a first trajectory of the vehicle on a visual flight rules (VFR) map or terrain map on the user interface, including a current position of the vehicle and the first trajectory pointing from the current position of the vehicle to a future position of the vehicle based on the selected maneuver direction and magnitude of heading change; and displaying a current position of each of the plurality of nearby moving objects relative to the current position of the vehicle.

14. The method of claim 13, wherein the user interface is configured to toggle between the VFR map and the terrain map with the first trajectory displayed thereon.

15. The method of claim 13, further comprising displaying an indicia on the user interface to indicate a status of the vehicle along an updated route, the status including a location of the vehicle along the updated route.

16. The method of claim 11, wherein the set of predefined prioritization rules comprises, in ranked order from first to last, the processing circuitry:

determining that a physically closest nearby moving object is the most-imminent conflict if the vehicle is in a near mid-air collision (NMAC) state;

determining that a nearby moving object predicted to cause the vehicle to enter a NMAC state is the most-imminent conflict if the vehicle is in a loss of well-clear (LOWC) state;

determining that the physically closest nearby moving object is the most-imminent conflict if the vehicle is currently in a LOWC state, but no NMAC state is predicted; or determining that a nearby moving object that is predicted to cause the vehicle to enter an LOWC state earlier than any other nearby moving object is the most-imminent conflict if the vehicle is not currently in an NMAC or LOWC state.

17. The method of claim 11, wherein evaluating the set of maneuvers includes the processing circuitry:

sorting the set of maneuvers by maneuver direction and increasing magnitude of heading change; and selecting, from the sorted set of maneuvers, a corresponding maneuver including:

a maneuver direction that complies with the predefined right-of-way rules; and a magnitude of heading change for the vehicle, as the selected maneuver to avoid the conflict.

18. The method of claim 17, wherein selecting the corresponding maneuver includes the processing circuitry:

selecting, from the sorted set of maneuvers, a first maneuver direction and magnitude of heading change in the set of maneuvers that does not result in a loss of well-clear (LOWC) state being predicted for the vehicle if the vehicle maneuvers in the selected maneuver direction and magnitude of heading change;

selecting, from the sorted set of maneuvers, the corresponding maneuver with a maneuver direction and magnitude of heading change that maximizes a distance at which the vehicle will remain a first threshold distance away from all of the nearby moving objects if no maneuver direction and corresponding magnitude of heading change will avoid the vehicle entering an LOWC state; or selecting, from the sorted set of maneuvers, the corresponding maneuver with a maneuver direction and the magnitude of heading change that leads fastest to a state where no conflict between the vehicle and the nearby moving objects is predicted if more than one of the set of maneuvers creates corresponding distances, at which the vehicle will remain away from all of the nearby moving objects, within a second threshold distance of each other.

19. The method of claim 11, wherein the set of maneuvers comprises an ordered list of maneuver directions and magnitudes of heading change, wherein the maneuver direction is either left or right and the ordered list is ordered such that all maneuvers with a left maneuver direction are given priority in the ordered list, along with corresponding magnitudes of heading change, over the maneuvers with a right maneuver direction.

20. The method of claim 19, further comprising:

receiving a preferred maneuver direction; and selecting a maneuver with the preferred maneuver direction unless no maneuver in the set that has the preferred maneuver direction will prevent a loss of well-clear.

* * * * *